Feb. 8, 1938.     T. H. THOMPSON     2,107,455

LEAF SPRING TREATMENT

Filed July 23, 1935

INVENTOR.
TOM H. THOMPSON
BY Bates, Golrick, & Teare
ATTORNEYS

Patented Feb. 8, 1938

2,107,455

UNITED STATES PATENT OFFICE 2,107,455

LEAF SPRING TREATMENT

Tom H. Thompson, Detroit, Mich.

Application July 23, 1935, Serial No. 32,725

9 Claims. (Cl. 267—47)

This invention relates to an improved treatment of leaf springs, such, for example, as are used on present-day automobiles and other vehicles. An object is to provide an efficient method and apparatus for securing freedom of flexing motion of leaf-springs during certain periods of operation thereof (as at low speeds) and dampening the flexing motion at other periods (as at high speeds), to the end of improving the riding qualities and maneuverability of vehicles equipped with such springs.

A further object is to provide a lubricating and/or dampening treatment for leaf springs which will be substantially uniform in operation after a short "breaking in" period; and which will be and remain sufficiently water- and moisture-proof so that the spring so treated will not require any boot or sheath to prevent access of weather elements to the spring.

Another object is to provide an improved self-lubricating spring which will not require a cover.

A further object is to provide a leaf spring treatment which will operate to effectively lubricate the spring, as well as dampen the flexing motion thereof under all temperature and climatic conditions that may be reasonably expected.

Another object is to provide a novel method of manufacturing material suitable for example as a spring liner.

Other objects and features of the invention will become apparent from the following description relating to the accompanying drawing showing a preferred form.

Figure 1:
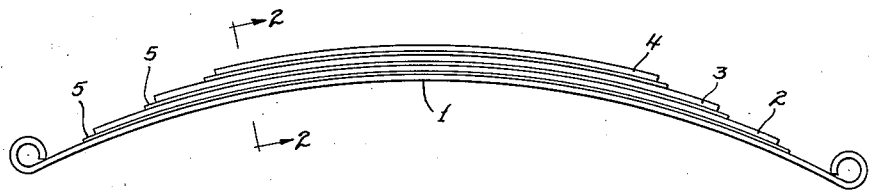
Figure 2:
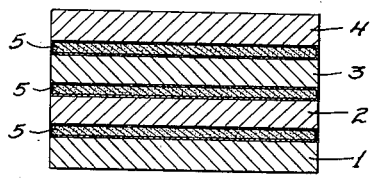
Figure 3:
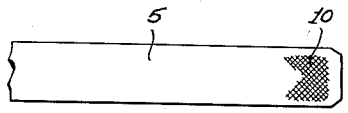
Figure 4:
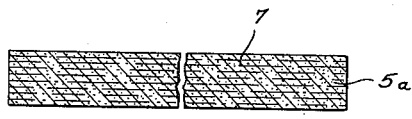
Figure 5:
Figure 6:
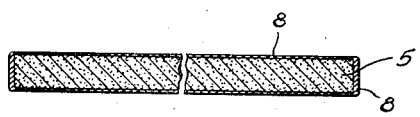

Referring to the drawing, Fig. 1 is a side elevation of a leaf spring assembly of a common type incorporating an embodiment of the invention; Fig. 2 is a transverse sectional view thereof taken as at 2—2 on Fig. 1; Fig. 3 is a fragmentary plan view showing one end of a spring liner and illustrating an exemplary condition after the "break-in" period; Fig. 4 is a diagrammatic transverse sectional view of a strip of material used to form the base of the preferred spring liner; Fig. 5 is a similar view showing the treatment of the strip shown in Fig. 4, with an anti-friction component and Fig. 6 is a view similar to Fig. 5, showing the finished liner.

One disadvantage of prior spring liners made of rubber, fabric, etc. has been high cost. Another is that the liners, if made to effect lubrication, have no dampening action and if made with dampening in view have no lubricating action.

The present liner is made on a base which is relatively very inexpensive and which is nevertheless tough and which, as exhaustive tests have repeatedly demonstrated, has a very desirable and highly satisfactory friction coefficient for the necessary dampening action at high speeds and which at the same time forms a highly suitable retaining base for my preferred anti-friction component for lubrication at all speeds.

Briefly, the present invention, in one form, comprises treating relatively inexpensive paper stock, say, for example, waste paper pulp, or so-called chip stock, preferably grade A of the latter, with a substance such as vermiculite, in such manner that flakes, scales or granules of the latter are distributed through the stock; then treating a strip of the resultant material with an anti-frictional component or lubricating material applied so that the anti-friction component substantially completely covers the strip, said treatment being effected under sufficiently high temperature and/or pressure to cause the lubricant to impregnate the paper stock; and thereafter treating the strip to reduce it to the desired dimensions and compactness of fiber to serve as a long-wearing spring liner. Strips made up as above outlined are assembled between adjacent spring leaves, preferably extending from end to end of respective leaves, and the spring is then ready to be mounted on the vehicle.

As shown in Fig. 1, conventional spring leaves are indicated at 1, 2, 3 and 4, 1 being the main leaf having suitable provision for attachment to shackles, etc. at its ends, the other leaves being shorter in the order of application to the main leaf, as is usual. The mid-portion of such spring assembly may be secured in a suitable retainer, not shown, which is in turn mounted on the vehicle.

Between the spring leaves are shown liner members 5, these being, for example, identical with each other except in the matter of length. As shown, the liners extend beyond both ends of the respective spring leaves which they underlie.

Referring now to Fig. 4, this illustrates a strip of fibrous material, such as chip paper stock indicated at 5a, incorporating a modifying agent such as granules, flakes or scales of material such as vermiculite, (zonolite, e. g., shown by small dots at 7). Other forms of mica may be used. The vermiculite acts in part to "temper" the paper stock; it having been observed that the liner reacts less readily to the destructive action of heat when the vermiculite is used. It also increases to some extent the frictional coefficient of the paper stock when the vermiculite e. g. is present on the paper surface and lubricant material is absent.

The agent 7 is preferably dispersed through the fiber or paper stock during manufacture, as by being mixed with the raw pulp, etc. in the beater prior to being picked up by the Fourdrinier belt. The vermiculite e. g. is preferably about 20% of the stock content by volume, viz: pulp fibers 80% vermiculite 20%. The proportions may, of course, be greatly modified. The pulp fibers may be treated as by asphalt oil as a preservative (say 15%).

Alternatively the vermiculite e. g. may be applied onto the separate webs of pulp, etc. as picked up on the Fourdrinier belt for subsequent lamination to produce the desired thickness of stock in the usual manner.

The thickness of the raw material may be, for example .085" (measured dry). The strips 5 may be cut to size from sheets of such stock or cut from sheets that have been further treated, as will now be explained.

Referring to Fig. 5, the stock is now dipped into a molten anti-friction component hereinafter termed "wax", the term being used to designate oleaginous materials preferably of the class of "fixed" oils, i. e. solid at normal temperatures. The bath is preferably maintained at a temperature of between ninety and ninety-five degrees centigrade. The stock is allowed to remain in the hot bath for say ten minutes. In uncalendered state the stock absorbs an indeterminate quantity of the wax, when dipped, and the exterior surfaces retain a coating as at 8, Fig. 5.

As a suitable composition for the wax, I recommend in the neighborhood of seventy-five percent paraffin, twenty percent carnauba wax and five percent of hydrolene. The carnauba wax is a melting point raising agent and the hydrolene is used to effect a better bond between the wax and the paper stock. The paraffin is the principal lubricating factor.

After the treated strip (Fig. 5) has cooled, it is then cold calendered, which drives a further portion of the wax into the body of the paper stock. From observation of the action of the liners it appears that the flakes or granules of vermiculite, contained in the paper stock, have a marked affinity for the wax and hold the same in reserve.

The result of cold calendering is illustrated in Fig. 6, wherein it is noted that the thickness of the strip is considerably reduced. The proportionate reduction is from a thickness of .085" (Fig. 5) to .050" (Fig. 6). I find that the above described procedure is much superior to calendering the stock before dipping, apparently because the more open formation of the raw paper stock (before calendering) allows the impregnation of the stock with the anti-friction component to just about the right degree.

Referring again to the tempering agent 7, namely, the flakes or granules of vermiculite e. g., this, it appears, toughens the paper stock and hardens it to some extent, as well as absorbing portions of the anti-friction component. The vermiculite itself has practically no lubricating power.

Referring to Fig. 3, this illustrates the condition of one of the strips 5 after use. The crosshatched zone 10 is the zone in which the relative movement and pressure between the spring leaf and the liner is greatest. During the "break-in" period this high relative movement and pressure apparently drives the anti-friction component from between the spring leaf surface and that of the paper stock so that the spring leaf rests directly on the paper fibers and whatever vermiculite is exposed thereon. This occurs only at end portions, such as 10, and the pattern so caused I term a "friction pattern". The remainder of the liner does not materially change in appearance.

At the friction pattern the spring will appear to have become somewhat embedded in the liner, and this is an important factor in maintaining the individual liners in position. The displaced lubricant at the sides of the friction pattern apparently swells the liner material and/or accumulates thereon to a sufficient extent to prevent side creepage of the liners out of place. It should be mentioned that the impression made by the spring at the friction pattern is not the result of removing any of the friction material of the liner, as by wear, although it may be compressed to some extent.

Exhaustive tests have demonstrated that the friction pattern remains unchanged after the first two or three thousand miles of driving, and that the surfaces of the liners intermediate the two friction patterns 10 on each liner retain their lubricating qualities so that the spring is not prevented from flexing under static loads and at minor dynamic loads, as when the vehicle rides over small bumps on a comparatively smooth track at low speed. At higher speeds and on rough roads the flexing motions are dampened by the frictional engagement between the spring leaves and liners at the friction pattern zones of the liners.

It will be seen from the above description that the liner is in the first place very inexpensive. None of the materials used is relatively costly. It will be understood that the vermiculite e. g. affords a much better dispersal of the anti-friction component, namely, the wax, probably because of the foliate nature of the vermiculite forms of mica and tendency thereof to readily exfoliate. Furthermore, the vermiculite is found to have a very uniform capacity for retaining a constant degree of friction, when surrounded by a substance having frictional qualities in excess of lubricating qualities. This is true, notwithstanding the fact that the vermiculite itself is low in lubricating power when used directly between working surfaces, such as between leaf springs. Moreover, it will be seen that the vermiculite has a toughening or tempering effect upon the paper and, being slightly resilient itself, it does not tend to make the liner brittle. Furthermore, by reason of the vermiculite being introduced into the basic structure of the paper the main body of the liner will wear much longer than without this treatment.

Spring covers can, of course, be used with the laminated spring structure herein shown and described, but such do not appear necessary from any standpoint. The liner material itself is substantially water and moistureproof. The accidental application of lubricant at service stations has no effect on the structure or operation since said lubricants cannot penetrate the liner and are ordinarily repelled by the anti-friction component thereof above specified.

I claim:

1. A leaf spring liner comprising a fibrous body, foliate mineral material embedded in the body in the form of flakes or scales, and a lubricant in solid form for which said mineral material has an affinity.

2. A leaf spring liner comprising a fibrous body, foliate mineral material embedded in the body in the form of flakes or scales, and a lubricant in solid form for which said mineral material has an affinity, said lubricant being embedded in said body.

3. A leaf-spring liner comprising a fibrous body having embedded therein flake material on the order of vermiculite, and containing lubricating material.

4. A leaf spring liner comprising a porous web of fibrous material, a lubricating material in wax-like form carried by the web, and granular means having an affinity for said lubricant, said means being embedded in the fibrous body of the web.

5. A leaf spring liner comprising a fibrous web, and a lubricant embedded in the fibers comprising paraffin, carnauba wax and a bonding agent.

6. A leaf spring liner comprising a fibrous web, containing mica flakes, and a lubricant comprising paraffin, and a hardening agent embedded in the fibrous structure of the web.

7. A leaf-spring assembly, comprising superimposed spring leaves, a flexible liner interposed between said leaves, said liner comprising fiber stock similar to paper having distributed therethrough flake material in the nature of vermiculite, and lubricating material embedded in the fibrous structure.

8. A leaf spring liner comprising a strip of porous material treated with vermiculite and a lubricant.

9. A leaf spring liner having vermiculite and a normally solid oleaginous material operatively associated therewith.

TOM H. THOMPSON.